US007483412B2

(12) United States Patent
Abhishek et al.

(10) Patent No.: US 7,483,412 B2
(45) Date of Patent: Jan. 27, 2009

(54) RANGE EXTENSION BETWEEN TWO WIRELESS DEVICES

(75) Inventors: Abhishek Abhishek, Woodinville, WA (US); Amer A. Hassan, Kirkland, WA (US); Christian Huitema, Clyde Hill, WA (US); Jiandong Ruan, Sammamish, WA (US); Poovanpilli G. Madhavan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 570 days.

(21) Appl. No.: 11/193,875

(22) Filed: Jul. 29, 2005

(65) Prior Publication Data

US 2007/0025388 A1 Feb. 1, 2007

(51) Int. Cl.
*H04Q 7/24* (2006.01)

(52) U.S. Cl. ....................... 370/338; 370/328
(58) Field of Classification Search ........................ None
See application file for complete search history.

(56) References Cited

U.S. PATENT DOCUMENTS 5,446,736 A * 8/1995 Gleeson et al. ............. 370/473
6,278,883 B1 8/2001 Choi
6,904,275 B2 6/2005 Stanforth
2002/0097182 A1 7/2002 Goren et al.
2002/0164963 A1* 11/2002 Tehrani et al. .............. 455/101
2005/0053037 A1 3/2005 Ginzburg et al.

OTHER PUBLICATIONS

International Search Report from International Application PCT/US2006/29353.

* cited by examiner

*Primary Examiner*—Erika A Gary
(74) *Attorney, Agent, or Firm*—Wolf, Greenfield & Sacks, P.C.

(57) ABSTRACT

A mechanism is provided to extend the range of wireless devices beyond the range limit that results from timing restrictions imposed by the IEEE 802.11 standard. The mechanism, which operates at the upper level of the 802.11 MAC, determines whether the wireless devices are far apart or not far apart. When the wireless devices are determined to be far apart, the standard retransmission protocol at the lower level of the 802.11 MAC is disabled and a custom ACK packet is utilized. Delivery of a transmitted packet is confirmed if the custom ACK packet is received within a maximum delay period that takes into account the longer propagation delay between wireless devices that are far apart.

17 Claims, 5 Drawing Sheets

(Prior Art)

RANGE EXTENSION BETWEEN TWO WIRELESS DEVICES

TECHNICAL FIELD

This invention relates to wireless networks and, more particularly, to a mechanism for extending the range between two wireless devices that operate according to the IEEE 802.11 standard.

BACKGROUND

In a typical wireless network, one or more wireless stations are associated with a common wireless access point. Communication between wireless stations is through the access point, which limits access to stations that have accepted security credentials and also provides an interface to other networks, such as a wired network and/or a public network, such as the Internet. The wireless network typically operates in accordance with the IEEE 802.11 standard for wireless Local Area Networks (LANs).

Wireless networking is now being used by all market segments: in-home, public access and the enterprise. The usage models include remote corporate access, Internet browsing in the home, peer-to-peer collaboration and, recently, voice-over-Internet. However, wireless networking based on IEEE 802.11 MAC (Medium Access Control) is only useful when the mobile station is approximately 150 meters from the access point relaying the data. For distances of approximately one kilometer, the wireless throughput is essentially unusable. Two devices operating according to the 802.11 standard, even when operating at maximum transmit power and using any antenna cannot effectively communicate at distances greater than about 200 meters due to timing restrictions of the CSMA/CA part of the 802.11 MAC.

SUMMARY

A mechanism is provided to extend the range of wireless devices beyond the range limit that results from timing restrictions imposed by the IEEE 802.11 standard. The mechanism, which operates at the upper level of the 802.11 MAC, determines whether the wireless devices are far apart or not far apart. When the wireless devices are determined to be far apart, the standard retransmission protocol at the lower level of the 802.11 MAC is disabled and a custom ACK packet is utilized. Delivery of a transmitted packet is confirmed if the custom ACK packet is received within a maximum delay period that takes into account the longer propagation delay between wireless devices that are far apart.

In one embodiment, a method for wireless communication between first and second wireless devices includes determining if the first and second wireless devices are far apart or not far apart. If the first and second wireless devices are determined to be far apart, a standard retransmission protocol is disabled, a packet is transmitted and the packet is placed in a per destination queue. If a custom ACK packet is received within a maximum delay period, the transmitted packet is deleted from the queue. If the custom ACK packet is not received within the maximum delay period, the packet is retransmitted from the queue.

In another embodiment, a wireless device includes a first component which determines if the wireless device and another wireless device are far apart or not far apart, a second component which disables a standard retransmission protocol if the wireless devices are determined to be far apart, a per destination queue, and a third component which transmits a packet and places the packet in the per destination queue. A fourth component deletes the transmitted packet from the queue if a custom ACK packet is received within a maximum delay period. The fourth component retransmits the packet from the queue if the custom ACK packet is not received within the maximum delay period.

In a further embodiment, a method for wireless communication between first and second wireless devices includes disabling a standard retransmission protocol at a lower portion of a medium access control layer, and transmitting packets using a custom protocol implemented at an upper portion of the medium access control layer.

BRIEF DESCRIPTION OF DRAWINGS

For a better understanding of the present invention, reference is made to the accompanying drawings, which are incorporated herein by reference and in which.

DETAILED DESCRIPTION

Figure 1:
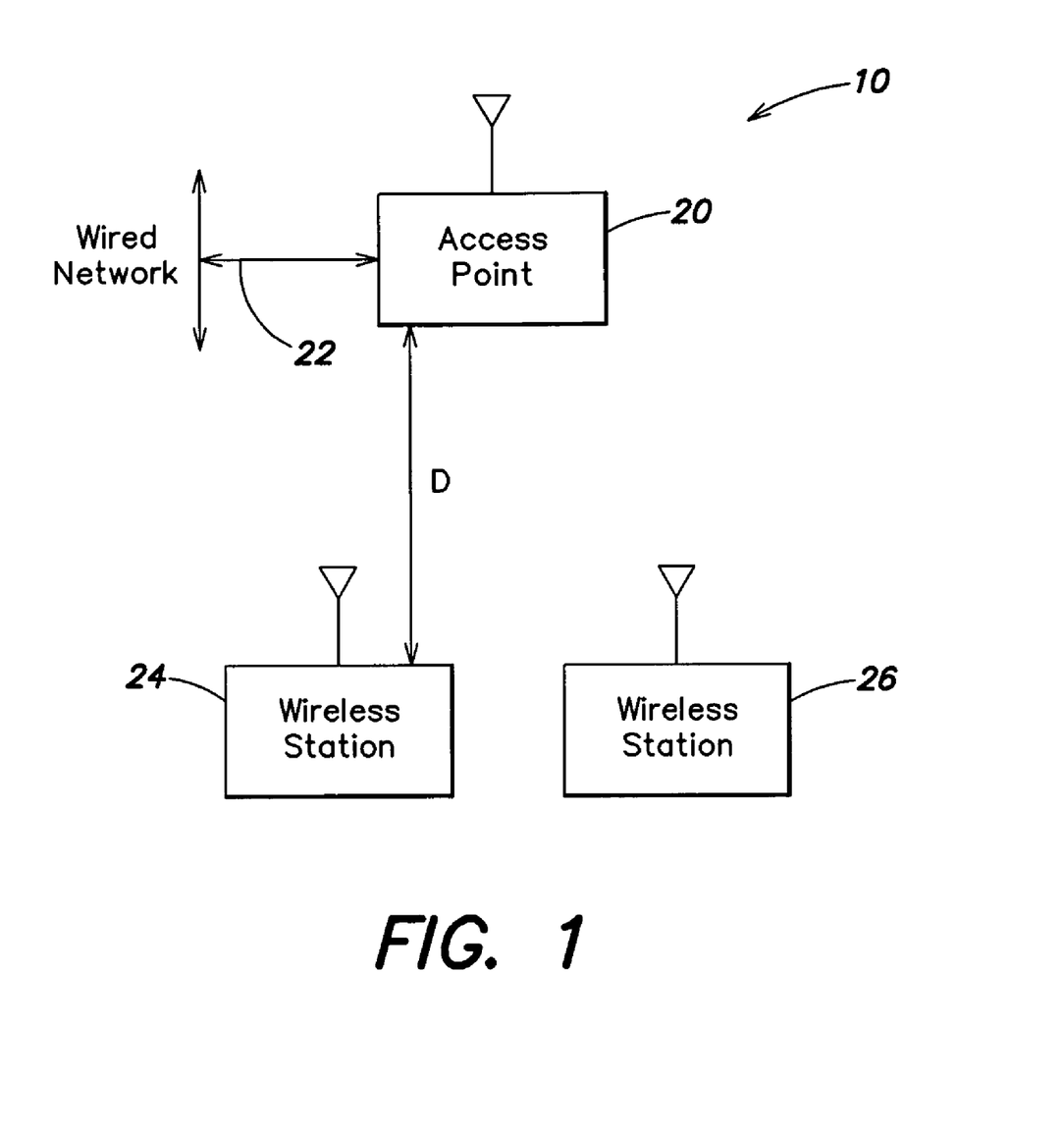
FIG. 1 is a simplified block diagram of a wireless network.

An example of a wireless local area network 10 is shown in FIG. 1. A wireless access point (AP) 20 communicates with a wired network through a wired connection 22 and communicates with a first wireless station 24 and a second wireless station 26 via wireless links. By way of example only, access point 20 may be a wireless router and wireless stations 24 and 26 may be notebook computers having wireless capability.

Each of the wireless stations may include a computing device with one or more processors equipped with an operating system to create a platform for application programs. The hardware portion of each wireless station may include one or more processors such as are now known or hereafter developed for use in computing devices. The software portion of each wireless station may include an operating system incorporating communication software as described below.

Two wireless devices in compliance with the IEEE 802.11 standard, when operated at the maximum transmit power and using any antenna, cannot effectively communicate at distances, D, greater than about 200 meters due to timing restrictions of the CSMA/CA part of the 802.11 MAC. A methodology is provided which allows the wireless devices to effectively communicate at larger distances without modifying the CSMA/CA part of the 802.11 MAC or requiring changes to the hardware. The two devices may be two access points, an access point and a client, or two clients.

The 802.11 MAC has the following rules relevant to broadcast and Unicast packets. (1) A broadcast packet transmission does not require an ACK (acknowledgement) packet to indicate that the transmitted packet was received correctly at the receivers. Hence, a broadcast packet is not retransmitted at the 802.11 MAC layer. (2) A Unicast packet transmission requires an ACK packet to indicate that the transmitted packet was received correctly at the receiver. If the sender does not receive the ACK packet within a SIFS (Short Interframe Space) interval plus ACK timeout interval, then it retransmits the packet at the next transmit opportunity. Other clients wait for a DIFS (Distributed Interframe Space) interval for the case of successful reception of the current frame or a EIFS (Extended Interframe Space) interval for a failed transmission before they contend for channel access using defined channel access procedures. A sender aborts retransmission after it reaches a retry limit. Short and long retry limits are used, and the decision on what type to use for retransmission is based on the size of the packet. If a packet is smaller than a specific size called an RTS (Request to Send) threshold, then the short retry limit is used for retransmission. Otherwise, the long retry limit is used. The default value of the short retry limit is seven, the long retry limit is four and the RTS threshold is 2347 bytes. All three parameters are configurable.

Two wireless devices can operate at maximum transmit power and use a directional antenna to increase physical reachability distance between them. This can be implemented with existing hardware in compliance with the 802.11 standard by proper configuration of transmit power level and the use of directional antennas and using standard methods of discovery and connection establishment as specified in the 802.11 standard. To achieve maximum range, the lowest rate of the BSS (Basic Service Set) rate set can be used. However, higher rates can be used if physical reachability can be sustained at the higher rates. The regulatory ruling for maximum transmit power for point-to-point is much higher than for point-to-multipoint. The directional antenna needed for extended range can be small with a modified RF front end.

Even when two such wireless devices can communicate at distances on the order of 1 to 2 kilometers, the CSMA/CA part of the 802.11 MAC has timing restrictions on Unicast packet transmission and reception which prevent communication at these distances. When a packet is transmitted, in addition to the transmission delay, a propagation delay is associated with the packet before it reaches the receiver. The propagation delay is a function of the distance between the sender and the receiver. A greater distance results in more propagation delay. The same applies to the ACK packet transmitted by the receiver when it finds the received packet to be valid. At a large enough distance, due to the corresponding large value of the propagation delay of the transmitted packet and its associated ACK packet, a standard delay period defined by the 802.11 MAC times out, and the transmitter retransmits the same packet. Since the transmitter did not receive the ACK packet within the standard delay period, it determines that the receiver did not receive the packet correctly. In reality, this may not be true. The ACK packet may be in transit when the standard delay period times out and the transmitter retransmits the packet. If the packet was received correctly at the receiver on the first transmission or retransmission, the receiver drops the subsequent retransmissions using a duplicate packet detection mechanism of the 802.11 MAC. However, the retransmissions result in a waste of bandwidth by a factor of ⅐ in the case of the default short retry limit and ¼ in the case of the default long retry limit.

If the transmitted packet was a fragment generated by the 802.11 MAC from one IP datagram or 802.11 MSDU (MAC service data unit), then the transmitter, on failing to successfully transmit the first fragment, i.e., after reaching the short retry or long retry limit for the first fragment, aborts the transmission of the remaining fragments, resulting in loss of the entire 802.11 MSDU. In this case, if the receiver received the first fragment successfully, it times out waiting for the other fragments of the same 802.11 MSDU and drops the fragment. Additionally, since the ACK packet may be in transit when the transmitter times out and retransmits the packet, there is a chance of collision on the retransmission.

Figure 2:
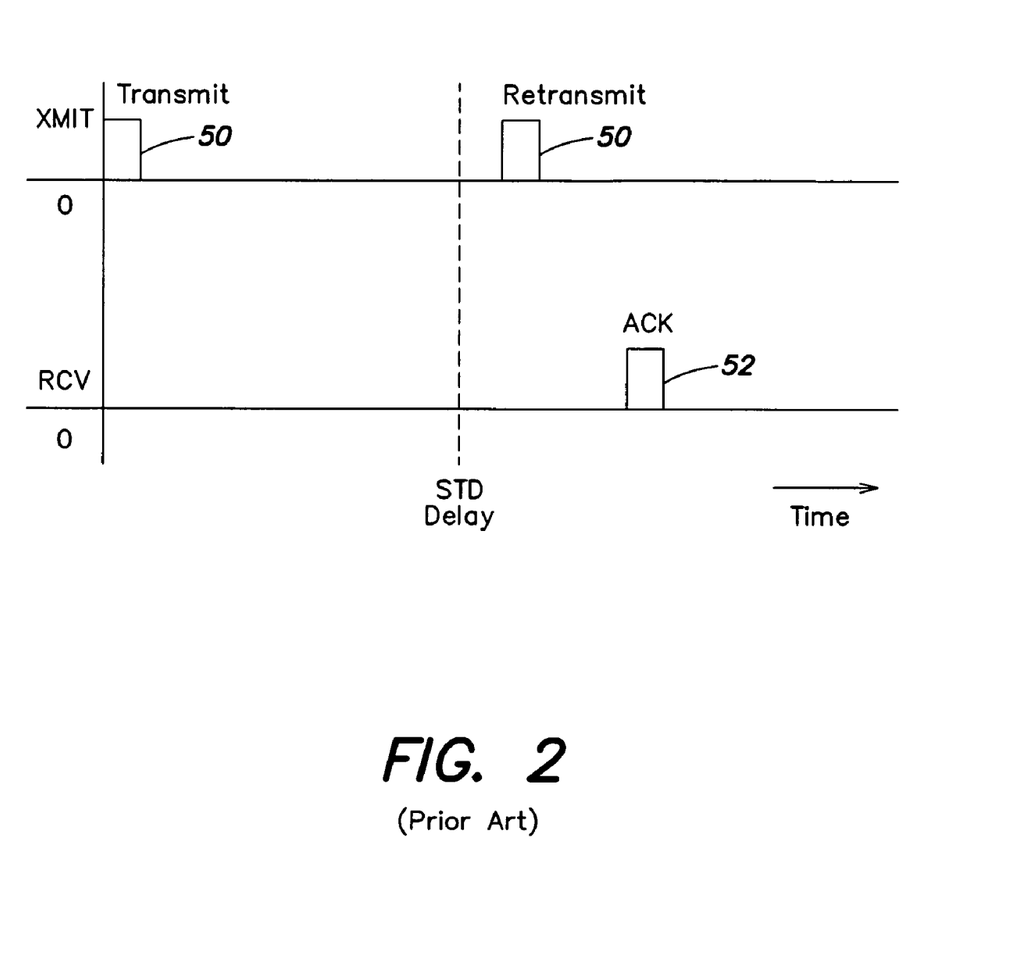
FIG. 2 is a timing diagram that illustrates transmitted and received signals in a prior art system.

Operation of the CSMA/CA part of the 802.11 MAC for far apart wireless devices is illustrated in FIG. 2. A packet 50 is transmitted at time zero and is received at the destination at a later time due in part to the propagation delay that corresponds to the distance between the devices. Assuming that the packet is successfully received, the receiver sends an ACK packet 52. Again, because of the propagation delay that corresponds to the distance between devices, the ACK packet 52 is received after the standard delay period times out. Therefore, the transmitter judges the first transmitted packet to be lost and retransmits packet 50 following timeout of the standard delay period. The packet is retransmitted despite the fact that the first transmission was successfully received at the destination, resulting in the inefficiencies described above.

The issues may be summarized as follows. (1) When the 801.11 MSDU is fragmented, the entire 802.11 MSDU is lost. (2) When the 802.11 MSDU is not fragmented, the success of the first transmission decides the success of delivery of the 802.11 MSDU at the receiver. (3) When the 802.11 MSDU is not fragmented and is successfully received on the first transmission, the bandwidth is wasted by a factor that depends on the values of the retry limits.

Any attempt to resolve these issues by modifying the CSMA/CA part of the 802.11 MAC requires changes to hardware and changes the on-air protocol, which makes such methods unattractive and creates a high probability of lack of interoperability with existing and standard hardware. Thus, the goal is a solution which does not modify the CSMA/CA part of the 802.11 MAC.

A wireless communication method to extend the range between two wireless devices is now described. The first step of the disclosed method involves detecting if two wireless devices that wish to communicate are far apart or not far apart. The distinction between far apart and not far apart is based on the distance beyond which two wireless devices cannot effectively communicate when using the standard 802.11 MAC protocol and is typically on the order of about 200 meters. The actual distinction between far apart and not far apart in a particular system depends on the timing parameters of that system. If the wireless devices are determined to be not far apart, the standard 802.11 MAC protocol may be used. If the wireless devices are determined to be far apart, the communication method described below is used to extend the range of the wireless devices. The determination of far apart or not far apart is made for each pair of wireless devices that wishes to communicate.

The detection of far apart or not far apart devices can be performed at any time, including the discovery and connection establishment phases. The detection logic involves determining that an ACK packet is actually received for an 802.11 MPDU (MAC protocol data unit) that is transmitted only once and the transmission status is indicated as having failed due to lack of reception of the ACK packet. The MPDU is transmitted only once to avoid potential collision between a retransmission and the ACK packet for the first transmission. In this case, the retransmission count is zero and the transmission status for the 802.11 MPDU is failure to receive an ACK packet within the standard delay period specified by the CSMA/CA part of the 802.11 MAC. If an ACK packet is received within the maximum delay period and before the transmitter obtains access to the channel to transmit the next packet, the devices are determined to be far apart. Several samples should be observed before making the far apart conclusion. The devices are determined to be far apart if an ACK packet is received within the maximum delay period for each transmitted packet and the received ACK packet is correlated with a failed transmission. Beyond the maximum delay period, the received ACK packet is discarded and is not correlated with a failed transmission. This detection results in application of the method for range extension described below. The detection logic can be provided as part of the upper MAC portion of the 802.11 MAC and not by extending the CSMA/CA layer or the lower MAC portion of the 802.11 MAC. This approach ensures that no changes to hardware are required for implementing the logic. If the ACK packet is received within the standard delay period specified by the CSMA/CA part of the 802.11 MAC, the devices are determined to be not far apart and the standard 802.11 communication method is used.

The detection logic may determine at any time that the two wireless devices are no longer far apart by determining that an ACK packet is received within the standard delay period. In this case, the ACK receive count is one, the retransmission count is zero and the transmission status of the 802.11 MPDU is success. Several samples should be observed before making a conclusion that the wireless devices are not far apart. Detection of not far apart results in using the standard 802.11 communication method and also restores the original values of the short and long retry limits.

For detection of far apart wireless devices, both wireless devices must support the detection logic and the disclosed method for range extension. The capability information may be communicated as part of the connection establishment phase, for example by using custom information elements.

Assuming the wireless devices are determined to be far apart as described above, the method for range extension is utilized. First, the short retry limit and the long retry limit values are set to zero. This ensures that the transmitter treats a Unicast packet as a broadcast packet. This means that the transmitter does not wait for an ACK packet confirmation from the receiver and does not perform retransmissions. However, this does not mean that an ACK packet will not be transmitted by the receiver upon successful reception of the packet. If the first transmission for each packet is successfully received by the receiver, issues (1) and (3) described above are resolved. The short retry limit and the long retry limit values should be set to zero for each 802.11 MSDU. This ensures that the ACK-based retransmission mechanism defined in the 802.11 standard is used for wireless devices that are not far apart and that the disclosed method for range extension is used only for wireless devices that are far apart.

To resolve issue (2) described above, the transmitter needs to determine when the transmitted packet is lost. The transmit logic to determine when the packet is lost can be provided by extending the upper MAC portion of the 802.11 MAC. The transmit logic maintains a per destination Unicast packet queue and monitors a custom ACK packet. The custom ACK packet can be a custom data packet or a custom management packet as defined in the 802.11 standard. For every Unicast packet transmitted to a destination determined to be far apart and for which the CSMA/CA part of the 802.11 MAC indicates transmission failure due to lack of reception of the standard ACK packet, the transmit logic continues to maintain the packet in the per destination packet queue until it receives the custom ACK packet or times out on the maximum delay period waiting for the custom ACK packet. In the case where the transmit logic receives the custom ACK packet within the maximum delay period, it removes the packet from the queue and proceeds with transmission of other packets. In the case where the custom ACK packet is not received before timeout of the maximum delay period, the transmit logic retransmits the packet and again waits for the custom ACK packet. The maximum number of retransmissions may be a configurable number.

When real collision occurs and the transmitted packet is lost, the standard technique of ACK-based retransmission is not employed. Therefore, the receiver needs a way to not timeout successfully received fragments when an 802.11 MSDU is sent as fragments and one of the fragments suffers from collision. One way to overcome this issue is to disable fragmentation on a per destination basis when the transmitter detects that the devices are far apart. However, fragmentation is helpful when the transmission error rate is high. The smaller packet transmits quickly, thereby reducing the chances of collision, and the retransmission cost for a fragment is smaller. Another way to overcome this issue is to extend the upper portion of the 802.11 MAC by maintaining an additional fragment counter. The custom ACK packet for each fragment increments the fragment counter. To ensure that the CSMA/CA layer logic is not triggered for sequence number and fragment number checks, the lower MAC is instructed to indicate its version of expired packets to the upper MAC.

Additionally, since each packet is transmitted only once at the CSMA/CA layer of the 802.11 MAC and since the standard ACK packet is received late, it is important for the transmitter to reserve enough channel access time to avoid other wireless devices contending for channel access. This can be achieved by placing an appropriate value in the duration field of the 802.11 header. This is an optimization, since most other wireless devices will sense the delayed standard ACK packet in time to avoid transmission.

Figure 3:
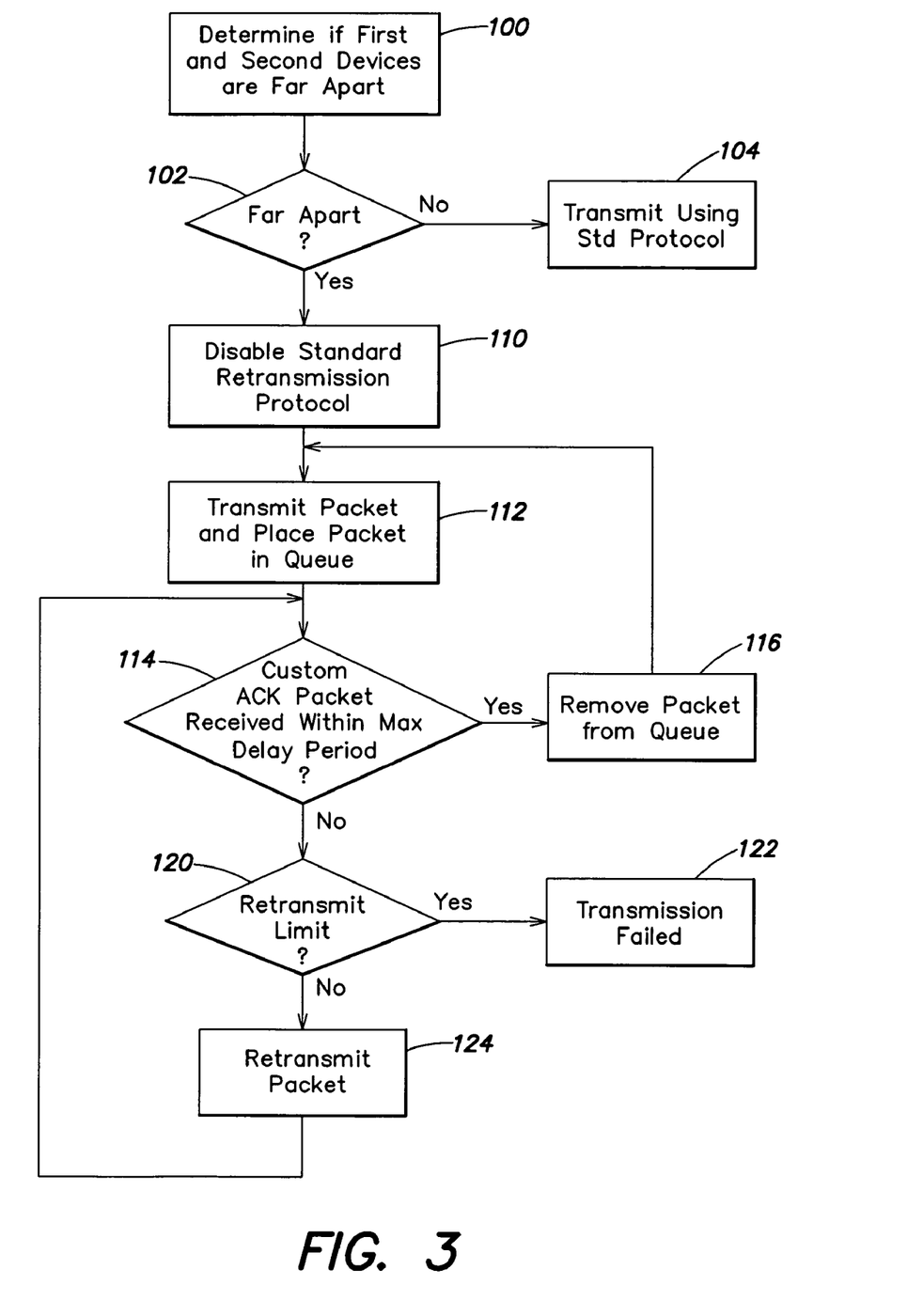
FIG. 3 is a flow chart of a communication method in accordance with an embodiment of the invention.

A method for range extension between two wireless devices in accordance with an embodiment of the invention is described with reference to FIGS. 3-6. A flow chart of the method for range extension is shown in FIG. 3. In step 100, a determination is made as to whether the first and second wireless devices are far apart or not far apart. The first and second wireless devices may correspond, for example, to wireless station 24 and access point 20 shown in FIG. 1. Step 100 is shown in greater detail in FIG. 4. If the devices are determined in step 102 to be not far apart, packets are transmitted from the first device to the second device using the standard protocol at the lower portion of the 802.11 MAC in step 104.

If the devices are determined in step 102 to be far apart, the standard 802.11 MAC protocol is disabled in step 110. As described above, the standard 802.11 MAC protocol may be disabled by setting the short retry and long retry limits to zero. This effectively causes each packet transmission to be treated by the lower MAC as a broadcast transmission, which does not require an acknowledgement.

In step 112, a packet is transmitted and the packet or a pointer to the packet is placed in a per destination queue. In step 114, a determination is made as to whether a custom ACK packet was received within the maximum delay period. The maximum delay period is longer than the standard delay period specified by the lower portion of the 802.11 MAC and allows for the longer propagation delay associated with far apart devices. If a custom ACK packet is received within the maximum delay period, the corresponding packet is removed from the queue in step 116, and the process returns to step 112 for transmission of other packets. If a custom ACK packet is not received within the maximum delay period, a determination is made in step 120 as to whether a retransmit limit has been reached. The retransmit limit corresponds to the retry limit used in the lower portion of the 802.11 MAC and, as described above, may be configurable. If the retransmit limit has been reached, the transmission status is changed to failed in step 122. If the retransmit limit has not been reached, the packet is retransmitted in step 124, and the process returns to step 114 to determine if a custom ACK packet was received within the maximum delay period in response to the retransmitted packet. Steps 112, 114, 116, 120, 122 and 124 constitute a custom protocol that is implemented at the upper portion of the 802.11 MAC.

Figure 4:
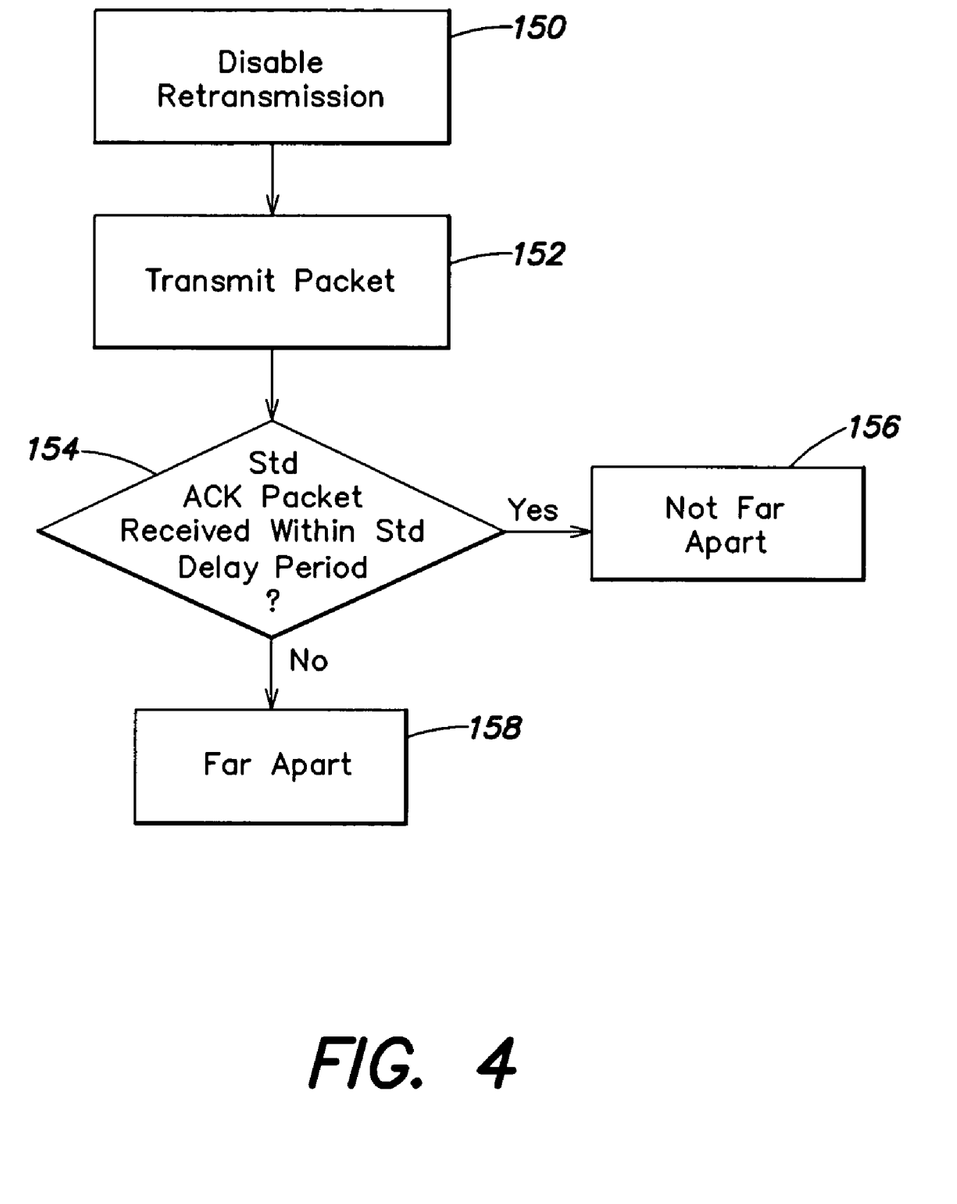
FIG. 4 is a flow chart of a method for determining whether wireless devices are far apart or not far apart.

A process for detection of far apart or not far apart devices is shown in FIG. 4. In step 150, retransmission at the lower portion of the 802.11 MAC is disabled by setting the short retry and long retry limits to zero. This effectively prevents retransmission of the packet. In step 152, a packet is transmitted from the first wireless device to the second wireless device. In step 154, a determination is made as to whether the standard ACK packet is received within the standard delay period. If the ACK packet is not received within the standard delay period, the transmission status may be indicated as failed. Thus, the transmission status may be used as an indicator of far apart or not far apart. If the ACK packet is received within the standard delay period, the devices are determined to be not far apart in step 156. If the ACK packet is not received within the standard delay period, the devices are indicated to be far apart in step 158. Steps 152 and 154 may be repeated several times and a conclusion reached if consistent results are obtained.

Figure 5:
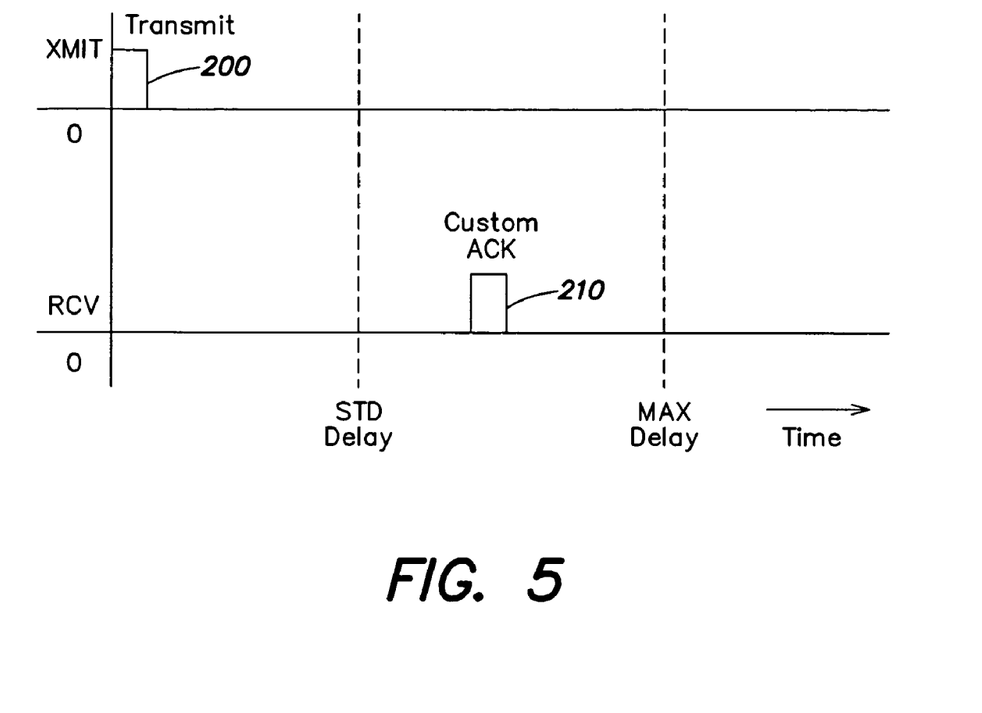
FIGS. 5 and 6 are timing diagrams that illustrate transmitted and received signals in accordance with an embodiment of the invention.

A timing diagram that illustrates a case where the custom ACK packet is received within the maximum delay period is shown in FIG. 5. Transmitted and received signals for the first wireless device are shown. A packet 200 is transmitted at time zero and is placed in a per destination queue. This corresponds to step 112 in FIG. 3. A custom ACK packet 210 is received after the standard delay period but before the maximum delay period, thus indicating that packet 200 was successfully received at the destination. The packet 200 is removed from the queue and is not retransmitted. This corresponds to steps 114 and 116 in FIG. 3.

Figure 6:
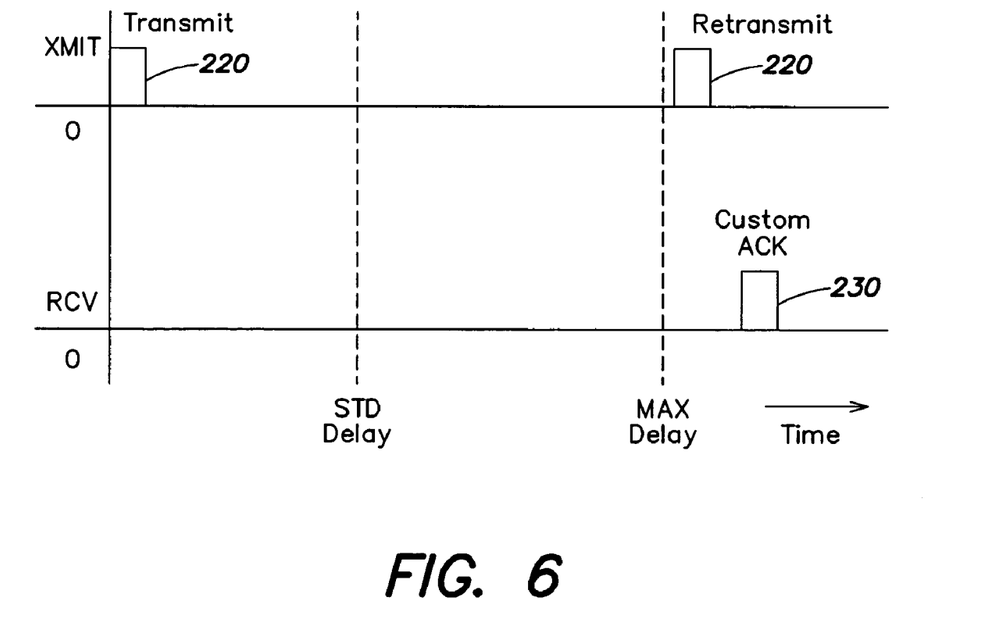

A timing diagram that illustrates the case where a custom ACK packet is not received within the maximum delay period is shown in FIG. 6. Transmitted and received signals for the first wireless device are shown. A packet 220 is transmitted at time zero. A custom ACK packet 230 is either not received or is received after the maximum delay period has timed out. In this case, packet 200 is retransmitted after the maximum delay period has timed out with no custom ACK packet having been received. This corresponds to steps 114, 120 and 124 in FIG. 3.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiment.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for wireless communication between first and second wireless devices, comprising:

determining if the first and second wireless devices are far apart or not far apart;

if the first and second wireless devices are determined to be not far apart, transmitting a packet in compliance with a wireless standard; and if the first and second wireless devices are determined to be far apart, disabling a standard retransmission protocol of the wireless standard; transmitting a packet and placing the packet in a per destination queue; if a custom ACK packet is received after a standard delay period of the wireless standard but within a maximum delay period that exceeds the standard delay period, deleting the transmitted packet from the queue; and if the custom ACK packet is not received within the maximum delay period, retransmitting the packet from the queue.

2. A method as defined in claim 1, wherein determining if the first and second wireless devices are far apart or not far apart comprises disabling retransmission of packets, transmitting a packet, and, if a standard ACK packet is not received within the standard delay period, determining tat the first and second wireless devices are far apart.

3. A method as defined in claim 1, wherein determining if the first and second wireless devices are far apart or not far apart comprises disabling retransmission of packets, transmitting a packet two or more times, and if a standard ACK packet is not received within the standard delay period for each of the transmitted packets, determining that the first and second wireless devices are far apart.

4. A method as defined in claim 1, wherein disabling the standard retransmission protocol comprises setting retry limits to zero.

5. A method as defined in claim 1, wherein disabling the standard retransmission protocol comprises disabling retransmission on a per packet basis.

6. A method as defined in claim 1, wherein retransmitting the packet from the queue comprises retransmitting the packet a configurable number of times if the custom ACK packet is not received within the maximum delay period.

7. A method as defined in claim 1, further comprising disabling fragmentation when the first and second wireless devices are determined to be far apart.

8. A method as defined in claim 1, further comprising enabling fragmentation, maintaining a fragment counter and incrementing the fragment counter with the custom ACK packet for each fragment.

9. A method as defined in claim 1, further comprising adjusting a value of a duration field in a packet header to provide sufficient time for receiving the custom ACK packet.

10. A computer-readable storage medium encoded with instructions for execution in a wireless device, the instructions, when executed, performing a method as defined in claim 1.

11. A wireless device comprising:
a processor; and
a computer-readable storage medium encoded with instructions that, when executed by the processor, perform a method comprising:
  determining if the wireless device and another wireless device are far apart or not far apart;
  if the wireless devices are determined to be not far apart, transmitting a packet in compliance with a wireless standard; and
  if the wireless devices are detennined to be far apart, disabling a standard retransmission protocol of the wireless standard, transmitting a packet and placing the packet in a per destination queue, if a custom ACK packet is received after a standard delay period of the wireless standard but within a maximum delay period that exceeds the standard delay period, deleting the transmitted packet from the queue, and if the custom ACK packet is not received within the maximum delay period, retransmitting the packet from the queue.

12. A wireless device as defined in claim 11, wherein determining if the wireless device and another wireless device are far apart or not far apart comprises disabling retransmission of packets, transmitting a packet and, if a standard ACK packet is not received within the standard delay period, determining that the wireless devices are far apart.

13. A wireless device as defined in claim 11, wherein disabling the standard retransmission protocol comprises selling retry limits to zero.

14. A wireless device as defined in claim 11, wherein the computer-readable storage medium is further encoded with instructions which disable fragmentation when the wireless devices are far apart.

15. A wireless device as defined in claim 11, wherein the computer-readable storage medium is further encoded with instructions which enable fragmentation, maintain a fragment counter and increment the fragment counter with the custom ACK packet for each fragment.

16. A method for wireless communication between first and second wireless devices, comprising:
  the first wireless device determining if the first and second wireless devices are far apart or not far apart by disabling retransmission of packets, transmitting a packet, and if a standard ACK packet is not received within a standard delay period of the IEEE 802.11 standard, determining that the first and second wireless devices are far apart;
  if the first and second wireless devices are determined to be not far apart, the first wireless device transmitting a packet in compliance with the IEEE 802.11 standard; and
  if the first and second wireless devices are determined to be far apart, the first wireless device disabling a standard retransmission protocol of the IEEE 802.11 standard; the first wireless device transmitting a packet and placing the packet in a per destination queue; if a custom ACK packet is received by the first wireless device after the standard delay period of the IEEE 802.11 standard but within a maximum delay period that exceeds the standard delay period, the first wireless device deleting the transmitted packet from the queue; and if the custom ACK packet is not received by the first wireless device within the maximum delay period, the first wireless retransmitting the packet from the queue.

17. A computer-readable storage medium encoded with instructions for execution in a wireless device, the instructions, when executed, performing a method as defined in claim 16.

* * * * *

UNITED STATES PATENT AND TRADEMARK OFFICE
CERTIFICATE OF CORRECTION

PATENT NO. : 7,483,412 B2  
APPLICATION NO. : 11/193875  
DATED : January 27, 2009  
INVENTOR(S) : Abhishek Abhishek et al.

Page 1 of 1

It is certified that error appears in the above-identified patent and that said Letters Patent is hereby corrected as shown below:

In column 9, line 10, in Claim 2, delete "tat" and insert -- that --, therefor.

In column 9, line 53, in Claim 11, delete "detennined" and insert -- determined --, therefor.

In column 10, line 16, in Claim 13, delete "selling" and insert -- setting --, therefor.

Signed and Sealed this
Third Day of May, 2011

David J. Kappos
*Director of the United States Patent and Trademark Office*